(12) United States Patent
Barnhill, Jr.

(10) Patent No.: US 8,635,316 B2
(45) Date of Patent: *Jan. 21, 2014

(54) SYSTEM AND METHOD FOR AUTOMATIC CONFIGURATION AND MANAGEMENT OF HOME NETWORK DEVICES

(75) Inventor: John A. Barnhill, Jr., San Francisco, CA (US)

(73) Assignee: PIE DIGITAL, Inc., Palo Alto, CA (US)

( * ) Notice: Subject to any disclaimer, the term of this patent is extended or adjusted under 35 U.S.C. 154(b) by 582 days.

This patent is subject to a terminal disclaimer.

(21) Appl. No.: 12/251,412

(22) Filed: Oct. 14, 2008

(65) Prior Publication Data

US 2009/0132698 A1 May 21, 2009

Related U.S. Application Data

(60) Provisional application No. 60/998,820, filed on Oct. 12, 2007.

(51) Int. Cl.
*G06F 15/173* (2006.01)
(52) U.S. Cl.
USPC .......................... 709/223; 709/224; 705/7.29
(58) Field of Classification Search
USPC ............. 709/207, 223–226; 705/10; 715/734; 707/792
See application file for complete search history.

(56) References Cited

U.S. PATENT DOCUMENTS

| | | | |
|---|---|---|---|
| 4,860,006 A * | 8/1989 | Barall | 370/447 |
| 5,655,148 A | 8/1997 | Richman et al. | |
| 5,838,918 A | 11/1998 | Prager et al. | |
| 6,198,479 B1 | 3/2001 | Humpleman et al. | |
| 6,286,047 B1 | 9/2001 | Ramanathan et al. | |
| 6,442,683 B1 | 8/2002 | Fleming, III | |
| 6,446,123 B1 | 9/2002 | Ballantine et al. | |
| 6,574,655 B1 | 6/2003 | Libert et al. | |
| 6,581,094 B1 | 6/2003 | Gao | |
| 6,801,507 B1 * | 10/2004 | Humpleman et al. | 370/257 |
| 6,836,796 B2 | 12/2004 | Schwartz et al. | |
| 6,895,588 B1 | 5/2005 | Ruberg | |
| 6,924,727 B2 * | 8/2005 | Nagaoka et al. | 340/3.1 |
| 6,978,301 B2 | 12/2005 | Tindal | |

(Continued)

OTHER PUBLICATIONS

Form PCT/ISA/220, "PCT Notification of Transmittal of the International Search Report and the Written Opinion of the International Searching Authority, or the Declaration," 1 pg.

(Continued)

*Primary Examiner* — Ninos Donabed
(74) *Attorney, Agent, or Firm* — Patterson & Sheridan LLP

(57) ABSTRACT

Embodiments of a method and system for automatically installing and managing consumer devices in a home network environment are described. A system implements automated configuration and maintenance of devices and their peripherals that connect to the home network, in particular the establishment of a distributed system that serves as a service platform which facilitates automated discovery and initial and ongoing deployment of a home networks and the devices that may interact with or connect to their network automatically or through manual means. An embodiment is directed to a distributed system and method for facilitated automatic configuration, maintenance, and diagnostics of a local area network that in parallel provides for the interoperability of connected intelligent independent computing devices using physical layer, network layer and application layer programmatic interfaces. This distributed system provides a generalized aggregated interface that is a programmatic resource for representing a continuous and historic reference of a local network and connected devices.

17 Claims, 14 Drawing Sheets

(56) References Cited

U.S. PATENT DOCUMENTS

| | | | |
|---|---|---|---|
| 7,047,293 | B2 | 5/2006 | Motoyama et al. |
| 7,082,200 | B2 | 7/2006 | Aboba et al. |
| 7,124,289 | B1 | 10/2006 | Suorsa |
| 7,146,542 | B2 | 12/2006 | Srinivasan et al. |
| 7,376,723 | B2 * | 5/2008 | Cho et al. .................... 709/223 |
| 7,454,120 | B2 * | 11/2008 | Putterman et al. ............ 386/291 |
| 7,548,960 | B2 * | 6/2009 | Kang et al. ................... 709/218 |
| 2003/0014521 | A1 | 1/2003 | Elson et al. |
| 2004/0002866 | A1 * | 1/2004 | Deisher et al. ................ 704/275 |
| 2004/0088731 | A1 * | 5/2004 | Putterman et al. ............. 725/94 |
| 2004/0210630 | A1 * | 10/2004 | Simonnet et al. ............. 709/203 |
| 2005/0002639 | A1 * | 1/2005 | Putterman et al. ............. 386/46 |
| 2005/0002640 | A1 * | 1/2005 | Putterman et al. ............. 386/46 |
| 2005/0088980 | A1 | 4/2005 | Olkkonen et al. |
| 2005/0232283 | A1 * | 10/2005 | Moyer et al. ................. 370/401 |
| 2006/0133392 | A1 * | 6/2006 | Ajitomi et al. ............... 370/401 |
| 2006/0168178 | A1 * | 7/2006 | Hwang et al. ................ 709/223 |
| 2006/0187858 | A1 * | 8/2006 | Kenichi et al. ............... 370/254 |
| 2006/0230130 | A1 * | 10/2006 | Cho et al. .................... 709/223 |
| 2007/0201384 | A1 * | 8/2007 | Cunningham et al. ........ 370/254 |
| 2007/0220024 | A1 * | 9/2007 | Putterman et al. ............ 707/101 |
| 2007/0234416 | A1 * | 10/2007 | Matsuoka et al. .............. 726/12 |
| 2008/0304408 | A1 * | 12/2008 | Kraemer et al. .............. 370/230 |

OTHER PUBLICATIONS

Form PCT/ISA/210, "PCT International Search Report," 3 pgs.
Form PCT/ISA/237, "PCT Written Opinion of the International Searching Authority," 6 pgs.
Chuang, Tamara, "Coming Soon," The Orange County Register, Sep. 21, 2005.
Barnhill, John, "Pie 6 Minute Presentation Script" Sep. 15, 2005 Script of live stage presentation given at Demofall 2005 Conference held on Sep. 21, 2005 in Orange County, California.
Pie, "Now Home Networking is Easy as Pie" 2005 Product Date Sheet distributed at Demofall 2005 Conference held on Sep. 21, 2005 in Orange County, California.

* cited by examiner

400

|  | FILES | SERVICES | PRINTERS | OTHER DEVICES |
|---|---|---|---|---|
| USER W/ PASSWORD | Open, custom hidden/protected folders | Open, custom settings (parental controls) | Open, custom printer settings | Open, custom based on device class |
| USER W/O PASSWORD | Open | Open | Open | Open |
| GUEST | Limited, guest folder | None | Open, time limit | None |

| | MANAGED DEVICE | UNMANAGED DEVICE | UNKNOWN DEVICE |
|---|---|---|---|
| CONNECTED TO USB | Find device information; device known and manageable | Tell user device known but unmanaged | Tell user device unknown and unmanaged |
| CONNECTED TO ENET | Install, apply policy levels, allow user configuration | Install, tutorial on further setup | Allow internet/network access |
| CONNECTED TO WIRELESS | Install, apply policy levels, allow user configuration | Install, tutorial on further setup | Tutorial based on device (limited, generic) |

| LEVEL | ITEM | STATUS | CLASS | DATE |
|---|---|---|---|---|
| RED | ROUTER | DISCONNECTED | DEVICE | 6/4/08 |
| YELLOW | HOME NOTEBOOK | DISK ERRORS | DEVICE | 6/1/08 |
| YELLOW | ANTI-VIRUS | OUT-OF-DATE | SERVICE | 5/15/08 |
| YELLOW | ROUTER | BANDWIDTH MISMATCH | NETWORK | 4/3/08 |

1002

Possible Resolutions:
    Check Ethernet
    Check Power
    Reboot Router (click to execute)
    Replace Router

| OPERATING SYSTEM | Windows XP | SP-3 Up to date | GREEN |
|---|---|---|---|
| SECURITY | Anti-Virus Firewall Spyware | Desktop - OOD Enabled Enabled | YELLOW GREEN GREEN |
| APPLICATIONS | Applications (12) | Enabled Up to Date | GREEN |
| SHARING | PCs (2) | Sharing Enabled | GREEN |
| QoS | Applications (4) | Default Prioritization | GREEN |
| UTILITIES | Utilities (14) | Installed Up to date | GREEN |

| | ACTION ITEMS | | | |
|---|---|---|---|---|
| Level | Item | Status | Class | Date |
| *color* | Laura's Laptop | Disk Errors | Device | 06/01/08 |
| Possible Resolutions:<br>• Disk Utility: Backup<br>• Disk Utility: chkdsk<br>• On Site: Recover Data<br>• On Site: Replace Drive<br>• | | | | |
| *color* | Bandwidth | Not full speed | Network | 04/15/08 |

| Device Information 1302 | Smith Home Information 1304 |
|---|---|
| User Name: Laura                     EDIT | Pie Serial Number: A03-11256 |
| Computer Name: Laura's Laptop        EDIT | Modem: Linksys N-Router WRT150N |
| Administrator Name: Laura            EDIT | Wireless Network Name: Smith Home |
| Configured Users: 1 | Guest Password:                               EDIT |
| IP Address: 192.168.123.4 | Security Key Nickname: easyaspie          EDIT |
| Domain: | Technical Security Key Name: WPA2         EDIT |
| Workgroup: | DSL Provider (ISP): SBC Pacbell |
| MAC Address: 00:0f:b5:39:44:ab | SBC Yahoo Member ID: lsmith@sbcglobal.com |
| Windows Version: XP Home Service Pack 2 | SBC Yahoo Password: 123smith               EDIT |
| Current HW Profile: Default | PRINT |
| Printer: HP Officejet Pro K5400 (via USB) | |
| Computer OEM: Toshiba | |
| CPU Speed: Stepping Monitor | |
| Number of CPUs: 1 | |
| CPU Type: Intel Pentium M 2.00G | |
| PRINT | |

FIG. 13

SYSTEM AND METHOD FOR AUTOMATIC CONFIGURATION AND MANAGEMENT OF HOME NETWORK DEVICES

CROSS-REFERENCE TO RELATED APPLICATIONS

This application claims priority from U.S. Provisional Patent Application No. 60/998,820, entitled "Distributed System and Method for Facilitated Automatic Configuration, Maintenance, and Diagnostics of a Local Area Network that in Parallel Provides for the Interoperability of Connected Intelligent Independent Computing Devices using Physical Layer, network Layer and Application Layer Programmatic Interfaces," filed Oct. 12, 2007, which is incorporated by reference in its entirety herein.

TECHNICAL FIELD

Embodiments relate generally to electronic consumer devices, and more specifically to facilitating the automatic installation and management of devices in a home network environment.

BACKGROUND

Home networks have evolved from residential local area networks for connecting computers and associated devices, such as printers and displays, to comprehensive systems that interconnect many types of electronic consumer devices that can be centrally managed. Many different devices, produced by different vendors and utilizing different resources and service requirements are being developed for use in home networks. With each device, there are usually large numbers of parameters that must be properly set to ensure compatibility and functionality within the network. At present, configuration management for home networks typically entails a high degree of user interaction with the applications and device, and a potentially high level of interaction with service providers, application vendors, or other third party content providers. This is often a time consuming and frustrating process for homeowners and installation personnel.

Home networking technology has essentially been synthesized down from business enterprise networking technology where companies have information technology (IT) teams to manage, maintain, and trouble shoot problems with their networks. Home networks are typically difficult to set-up for the average mass-market consumer, and when something goes wrong, or there are problems with a device connected to a home network, the consumer does not know where or how to diagnose or knowledgeably repair the problem, causing significant frustration and potentially lost use of their network and/or connected device. As such, in contrast to a business, when a device is to be connected or set-up, or problems arise with home networks, the consumer must either learn the management processes themselves, or seek other trained third-party information technology specialist to help.

One of the drivers for a consumer purchase of a home network is an interest/need for having and/or sharing a high-speed (broadband) Internet connection. The businesses that provide these connections (commonly known as Internet Service Providers) to consumer households must manage their own infrastructure technology to deliver the expected service to the home. Consequently, the technology for device management is often deployed within the networks of ISPs to provision and deliver the service to a connection point/gateway device in the home. Installation requires the consumer or a third-party to connect either a network-enabled personal computer, or separate home networking device(s) to that connection point/gateway in order to access and make use of the Internet services within the home. The device management system enables the ISP to manage and control their network devices to the gateway, but the system lacks the ability to manage the various network capable devices beyond the gateway point that may be used and connected throughout the consumer's home network. When problems arise with a home network, the consumer most often contacts the ISP to help them identify and solve the problem. Because the ISPs device management technology cannot manage the devices other than their gateway device, problem resolution is manually managed with the consumer, and is often done by trial-by-error. This process is costly to the ISP and frustrating to the consumer.

Third-party IT service companies have increasingly been providing network management services for enterprises, and these markets have expanded to provide similar services to consumer households to support home networks and connected devices. However, service to home networks by third-parties is typically only done when the consumer requests service to repair a problem/episode when identified by the consumer, and typically requires a technician to be on-site at the home or remotely provide the service. For managing their services, some of these service companies have deployed limited information systems to store details about services they provide to a consumer that is collected manually by the technician when he is at the consumer home. Most present systems do not maintain information about the specific configuration or state of the home network that is being serviced, or about the other home devices that may be similarly configured. Manufacturers of home networking focused devices and services search to apply technology and methods for a transparent and automated set-up of consumer networking devices, as well create a clear path for efficient service models for their products. At best, the manufacturers and service providers can only provide an isolated view of only an individual product.

What is needed, therefore, is a system that collects and provides a consolidated view for a service or state of a product among a pool of other products that may be interoperating on a specific home network.

Certain systems have been developed for personal computers (PC) that provide utilities for a home networking and management, and when running in a standard operating system (e.g., Windows XP) that provides notifications on the PC display of basic home network problems as they arise and suggests self-directed fixes to the end-user. However, these systems require the consumer to install the software on each PC on the home network (assuming the each target PC is in good operating order). Such applications do not work on devices other than PCs, and require that the consumer understands the basic principals of home networking, as well the configuration parameters of the network connected devices, and can recognize and address problems on an individual device-by-device basis. Most consumers do not have this understanding, and for those that do, network setup and maintenance is often a very tedious and time consuming process.

What is further needed, therefore, is a system that facilitates installation, provisioning, and maintenance of devices within a home network such that minimal user interaction is required.

BRIEF DESCRIPTION OF THE DRAWINGS

Embodiments of the present invention are illustrated by way of example and not limitation in the figures of the accompanying drawings, in which like references indicate similar elements and in which:

FIG. 4 is a table that illustrates an example of user privilege restrictions for use with a managed computer system, under an embodiment.

FIG. 7 is a table that illustrates actions associated with addition of a new device in a managed home network, under an embodiment.

FIG. 10 illustrates an example web page for a device view of the home network management user interface, under an embodiment.

FIG. 11 illustrates an example web page for a services view of the home network management user interface, under an embodiment.

FIG. 12 illustrates an example of an action item display area, under an embodiment.

FIG. 13 is an example of a client computer interface screen to the service node system, under an embodiment.

SUMMARY

Figure 1:
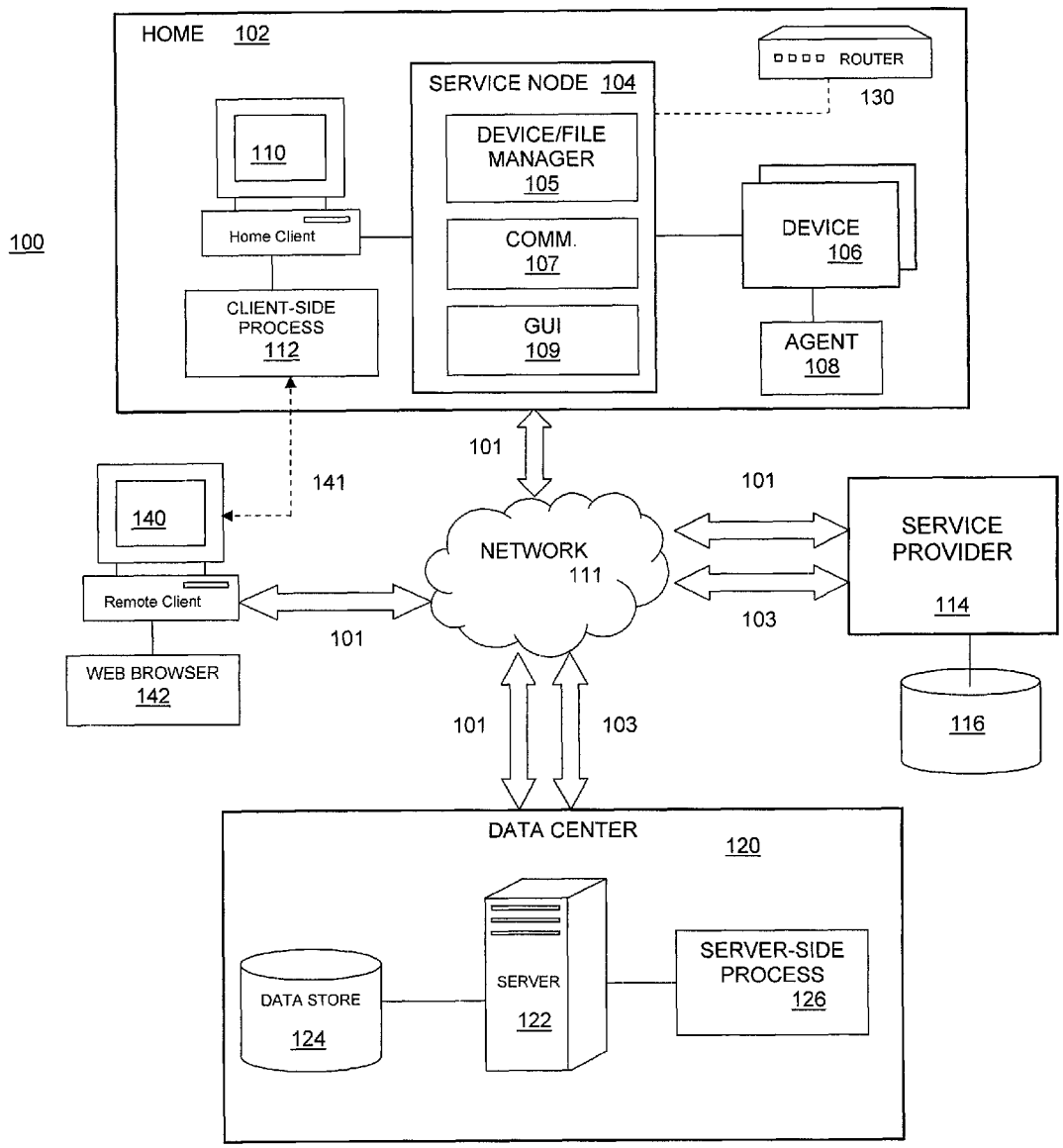
FIG. 1 illustrates a computer network system 100 that implements one or more embodiments of a home network management system.

There are several discrete steps required for establishing a home network. Under present systems, consumers are required to launch and run software application utility wizards on the PCs that they want to connect to a home network and through additional software, set-up critical networking devices, such as a router. The computer industry has attempted to automate the process with the introduction of standards such as Universal Plug and Play (UPnP Forum). This standard has long been seen as a way for home networking and consumer device manufacturers to ease and automate the set-up and discovery of devices on home networks. However, UPnP while widely available, has not yet reached its goal as an ubiquitous application for device discovery and network configuration, due largely to the complexity of the device interfaces and because of the failure of device manufacturers to completely implement the standard into their product lines. Additionally some home networking devices also require additional interaction by the consumer to complete the set-up. Another device networking industry standard called Zero-Configuration (Zero-conf) has been developed to provide a similar level of automated home networking device discovery and configuration. However, the Zero-conf standard requires that the home networking has been properly established prior to its operation. Moreover, it does not provide routing, and devices must have the Zero-conf setting turned on. Ultimately, the consumer can buy additional software applications to help them to automate some of the different aspects of the set-up process, but none are comprehensive.

Embodiments of a method and system for automatically installing and managing consumer devices in a home network environment are described. A system implements automated configuration and maintenance of devices and their peripherals that connect to the home network, in particular the establishment of a distributed system that serves as a service platform which facilitates automated discovery and initial and ongoing deployment of a home networks and the devices that may interact with or connect to their network automatically or through manual means. An embodiment is directed to a distributed system and method for facilitated automatic configuration, maintenance, and diagnostics of a local area network that in parallel provides for the interoperability of connected intelligent independent computing devices using physical layer, network layer and application layer programmatic interfaces. This distributed system provides a generalized aggregated interface that is a programmatic resource for representing a continuous and historic reference of a local network and connected devices. Embodiments include a holistic digital device service delivery across a home network through the integration of a facilitated device management system and maintaining a separate system that enables and facilitates a managed home network. It is distributed system that takes advantage of both a 3-tier and N-tier architecture. The system is composed of an Internet-based collection of host computer systems, an embedded intelligent system appliance, intelligent software agents, and cross-platform personal computer software. The system essentially provides an aggregation resource that collects and provides to a service provider a holistic view of the entire network context in terms of the devices, applications, and interconnections among devices in the network. The system provides the ability to effect change in the network based on the context of the network.

DETAILED DESCRIPTION

In the following description, various examples are given for illustration, but none are intended to be limiting. The embodiments described herein provide a system for the installation, detection, and management of consumer devices in a home network environment. The embodiments described herein include a system for managing configurations of wired and wireless devices in a home network and the interface with a data center and one or more service providers to maintain these devices.

Aspects of the one or more embodiments described herein may be implemented on one or more computers executing software instructions. The computers may be networked in a client-server arrangement or similar distributed computer network. FIG. 1 illustrates a computer network system 100 that implements one or more embodiments of a home network management system. As shown in FIG. 1, the overall environment 100 comprises a home 102 containing a number of electronic and computing devices coupled to one or more other entities over a network 111. The home can include a number of consumer electronic devices 106 that perform various functions or provide various services, such as computing, entertainment, lighting and security, information management and so on. Examples of such device include televisions, CD/DVD players, cable access boxes, satellite boxes, computers, game consoles, stereo equipment, digital cameras, video cameras, home appliances, security sensors, and any other type of consumer device. Each device 106 runs an agent process 108 that allows the device to be configured via a service node 104. The service node represents a customer premise equipment device that is configured to communicate with and facilitate the management of any number of compatible devices 106. The service node 104 includes a number of functional components that provide device and file systems management 105, communication functionality 107, and user interface functionality 109, as well as other functions. The service node essentially accomplishes the tasks of facilitating the management of the home local area network (LAN), monitoring the operational aspects of each of the devices 106 within the LAN, executing various policies, performing integrity checks, and facilitating the remote processing of the system, including software updates and diagnostics. The policies can include service provider policies that dictate how a service provider wishes to manage a device; device specific policies, such as configuration options; and system specific policies, such as user privileges, resource sharing, and security protocols.

The service node may be coupled, either through wired or wireless communication links to the devices 106 and a home client computer 110. In one embodiment, the home client 110 executes a client-side process 112, which provides a comprehensive graphical user interface for display and input control of the functions provided by the service node. The client-side process 112 is a browser-based application that provides a view into the deployed service node system. The client-side process represents a client portal application that allows the homeowner or system administrator to monitor connected devices 106 in the home network. The home client computer 110 may be any type of workstation or personal computer class device, such as a PC, notebook computer, personal digital assistant, or similar computing device. Alternatively, home client 110 may be a mobile client device, such as a cell phone, smartphone, or any mobile communication device that provides access to the home network environment and has a sufficient degree of user input and processing capability to interface with the service node 104, as well as sufficient capabilities to display a reasonably comprehensive user interface page. The client computer 110 may be coupled to the service node 104 over a wired connection, a wireless connection or any combination thereof.

The agent process 108 is installed on each device 106 and acts as a proxy to the service node 104. Agents can be installed on any active device, that is, one that can store and execute programs supporting a defined operating system. Examples of such operating systems include Linux, Microsoft® Windows XP™ or Vista™, Apple® Mac™ OS X, and so on.

The home network environment 102 is coupled to a data center 120, which provides various back office functions to support the functionality of the service node 104 within the home 102. The data center 120 includes one or more server computers 122 executing server side process 126 that comprises enterprise class software including automatic configuration server (ACS) processes, operational support system (OSS) processes, and business support systems (BSS), among others. In one embodiment, the network 111 is the Internet network, and service node 104 and the data center 120 communicate through secure channels 101 over the Internet using standard IP (Internet protocol) communication. The communication may be encrypted for secure transmission. A single data center may support any practical number of home environments 102, depending upon processing and storage capacity. The data center essentially accomplishes the tasks of providing a provisioning mechanism for the service node 104, recommending policies and updates for the home network 102, providing an interactive view of the home network, and providing a repository for each home network through one or more data stores 124. The data center may be connected to the Internet through a secure communication channel over a VPN (virtual private network) 103 or through an encrypted communication channel 101.

As shown in FIG. 1, the home network 102 and data center 120 are coupled to a service provider platform 114 through network 111. The service provider may be any entity that provides technical support related to any of the devices 106 or home network infrastructure. Such entities may be device manufacturers, retail establishments, computer consultants, telecommunication companies, network installation professionals, or any type of service provider who may provide products or expertise utilized by the homeowner or system administrator. In an embodiment, the home network management system is designed to be implemented as part of an automated managed home network service delivery platform that is provided by a service provider 114, which may be a home IT Services Company or Internet Service Provider/Broadband Service company to its consumer. Such a service can be offered by a third party. The service acts as an automated technical support technician that is capable of managing all of the devices 106 configured for a customer's home network while also providing its customer with simple facilities for notification, integrated management console and access to their subscribed services. The service provider platform 114 may be connected to the Internet through a secure communication channel over a VPN (virtual private network) 103 or through an encrypted communication channel 101.

In system 100, the home LAN 102 is coupled, directly or indirectly, to one or more server computers 122 or other resource computers through one or more possible networks, such as wire or wireless (e.g., cellular) telephone networks and/or the Internet 110. The network interface between server computers and the client computers may include one or more routers 130 that serve to buffer and route the data transmitted between the server and client computers. Network 111 may be the Internet, a Wide Area Network (WAN), a Local Area Network (LAN), or any combination thereof. The client-side 112 and server-side 122 processes may represent one or more executable programs modules that are stored within an associated computer and executed locally within the computer. Alternatively, however, they may be stored on a remote storage or processing device coupled to the associated computer or network 111 and accessed by the computer to be locally executed. In a further alternative embodiment, the server-side process 122 may be implemented in a plurality of different program modules, each of which may be executed by two or more distributed server computers coupled to each other, or to network 111 separately. In an embodiment in which network 111 comprises the Internet, a web server process comprises a gateway for data center 120 communication with the client. The web server can be a separate web server or, in some cases, it may be a process executed locally in server 122.

In one embodiment, the client device 110 executes a client-side process 112 to interact with the server-side process 122 and to allow implementation of configuration changes autonomously on the mobile device. A separate content provider, e.g., service provider 114 may provide some of the data that is included in the configuration management process. Data for any of the configuration parameters, rules, and the like may be provided by a data store 116 or 124 closely or loosely coupled to any of the servers 122 or service provider platforms 114. The client-side process 112 represents agent code that resides on the home client computer. This agent code provides user interface functionality for the service node 104, as well as management of the devices 106 through proxy and proxy agent emulator routines. For an embodiment in which the service node operates as a standalone unit with no client computer support, the service node executes agent emulation code that runs locally on the service node.

The service node 104 can be configured to provide a user interface portal to the managed home system that is accessed through a web browser from either the home computer 110, a server computer 122, or the node device itself 104. This portal can also be accessed by other external computers, such as remote client computer 140. The remote client 140 runs a web browser process that accesses the home LAN 102 through the Internet 111. This provides a virtual link 141 to the home client 110 and/or the service node 104. The remote client 140 allows a user to access the home LAN through an external computer. It also allows authorized agents (e.g., tech personnel) to access the home LAN 102. Appropriate security policies can be established to ensure only authorized access to the system.

The system of FIG. 1 provides a comprehensive home network management system that provides great improvement over prior products based on isolated utility applications that perform separate hardware, software, and network test functions, and require installation of separate device management gateway application tools, and remote specialist support to specific client computers. System 100 allows a service provider 114 to deliver a managed integrated service that combines probes, intelligent agents 108, and automated systems to solve the user's problems with their home networks and devices before they are aware a problem may exist. Additionally, unlike existing systems, the combined diagnosis, repair, maintenance, and management can be done without the service providers' customer having detailed technical knowledge.

In general, the service node processes are based on service oriented architecture (SOA) principals. For both the home environment 102 and the data center 120, the required functionality is deployed using standards-based frameworks. Every system entity, including the service node 104 is modeled as a service and may take the role of a service provider or a service requester, or both. A service may be a simple standalone service or a composite service, and service discovery is performed through a service registry.

Service Node

Within the home network environment 102, the service node 104 acts as the central resource for managing devices 106 and interfacing to the data center 120 and any available service providers 114. The client-side process 112 executed on a home client 110 represents an alternative interface to the control functions provided by service node 104. The service node provides a framework that allows continuous deployment of applications and services in run-time. These include control functions, such as dynamic installation, updates, and activation/deactivation of services. The service node also provides integration points through high level application program interfaces (API) for third party integration.

Figure 2:
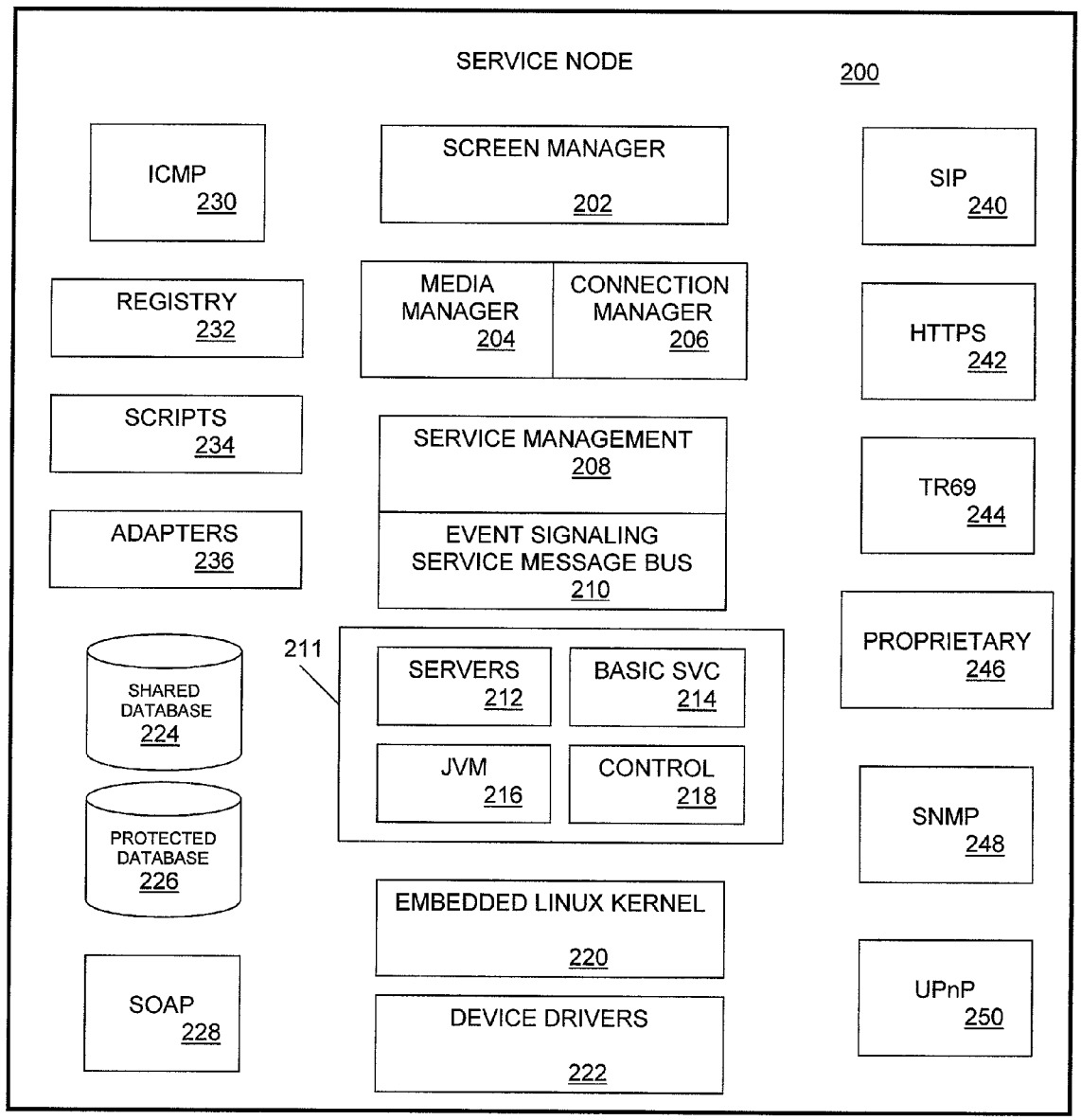
FIG. 2 is a block diagram of the functional components of a service node, under an embodiment.

FIG. 2 is a block diagram of the functional components of a service node, under an embodiment. The service node comprises a number of different functional modules and may be implemented as a layered and distributed Java-based SOA framework. The service platform of the service node provides the devices 106 with the APIs to register and advertise their services in the service node. In turn, the service node can launch a single or composite service to accomplish one or more pre-defined tasks. In one embodiment, these tasks are modeled as templates and executed within a workflow engine. Some of the processes can be executed automatically through a process of retrieving values from the data center 120, while others may require user intervention, such as requiring user action to approve the launch of an installation. The service node implements an OSGI (Open Services Gateway Initiative) framework to allow the devices and application to register their services in the service node's service directory. It also allows the entities to subscribe to and receive events signaling changes to the registry for a given service.

In one embodiment, the service node system 200 is built around an embedded Linux kernel 220. The main functional components include device drivers 222 that control the devices 106, a screen manager 202 that implements the GUI functionality 109 of the service node, medial manager 204 and connection manager 206. The service node 200 also includes a comprehensive file system that includes one or more databases, such as shared database 224 and protected database 226, and data structures for a registry 232, scripts 234, and adapters 236.

The service node 200 includes several protocol stacks that are supported as part of network monitoring, management, and operations. The protocol stacks are wrapped in containers and viewed as a deployable service within the entire home network management system.

The service node 200 includes several different modules for various communications protocols for interfacing with the devices 106. In one embodiment, the service node implements the Universal Plug and Play (UPnP) protocol 250. UPnP is a set of computer network protocols that allow the devices 106 to connect seamlessly in order to simplify the implementation of networks in the home for data sharing, communications, and entertainment, and in corporate environments. UPnP achieves this by defining and publishing UPnP device control protocols built upon open, Internet-based communication standards. The UPnP architecture allows peer-to-peer networking of PCs, networked appliances, and wireless devices. It is a distributed, open architecture based on established standards such as TCP/IP, UDP, HTTP and XML. Thus, communication can be over any protocol, such as UPnP, UDP, TCP-IP, Zero-conf, HTTP, or HTTPS.

In one embodiment, the service node takes the role of a UPnP control point. A discovery task running on the service node performs first level analysis on the home LAN, creates a topology map and shares a subset of results with the data center 120. After the initial boot, self-check, and discovery tasks are completed, the service node checks for an IP connection. If the Internet connection is available, the service node registers with the ACS server in the data center 120 through a protocol such as session initiation protocol (SIP) 240 or simple object access protocol (SOAP) 228.

Through the UPnP architecture, the service node 200 also supports zero-configuration (Zeroconf) networking. Under the Zeroconf specification, a UPnP compatible device from any vendor can dynamically join a network, obtain an IP address, announce its name, convey its capabilities upon request, and learn about the presence and capabilities of other devices. This provides for the discovery of local services through multicast DNS (domain name system) within a local network, usually without the need for configuration or special servers. Many different Zeroconf solutions exist, such as Bonjour™ from Apple® Inc., which uses multicast DNS and DNS Service Discovery.

As shown in FIG. 2, the service node 200 also includes several other protocols for implementing home network solutions. This includes the TR-069 specification 244 defined by the Broadband forum (DSL forum), which provides tools for auto-configuration and dynamic service provisioning, software/firmware image management, status and performance monitoring, diagnostics, and file download initiation through server push or client pull models. Other specifications that may be used include SNMP, HTTPS, DOCSIS (Data Over Cable Service Interface Specification) 3.0, TR64, and TR69.

The service node 200 implements the simple network management protocol (SNMP) 248 to act as a network management agent (NMA), which gets high level instructions from the data center 120. The data center acts as a network management system (NMS) instructing the service node with "Get" and "Set" operations to executed on a target managed entity, such as a router 130, computer 110, or other device 106. The Get and Set operations are used to obtain status and to modify the properties of a particular device, application or other entity.

The service node can also implement aspects of the OMA-DM protocol defined by the Open Mobile Alliance for functions related to device management (DM), data synchronization (DS) and file downloads. This can include java-based protocols for downloading files and applications onto mobile devices through various over-the-air (OTA) protocols. The service node 200 also includes an automated configuration server (ACS) module 211 that provides provisioning and maintenance functions for the service node. The ACS provides the primary control point for the service node and implements a web service API over secure channels.

Figure 3A:
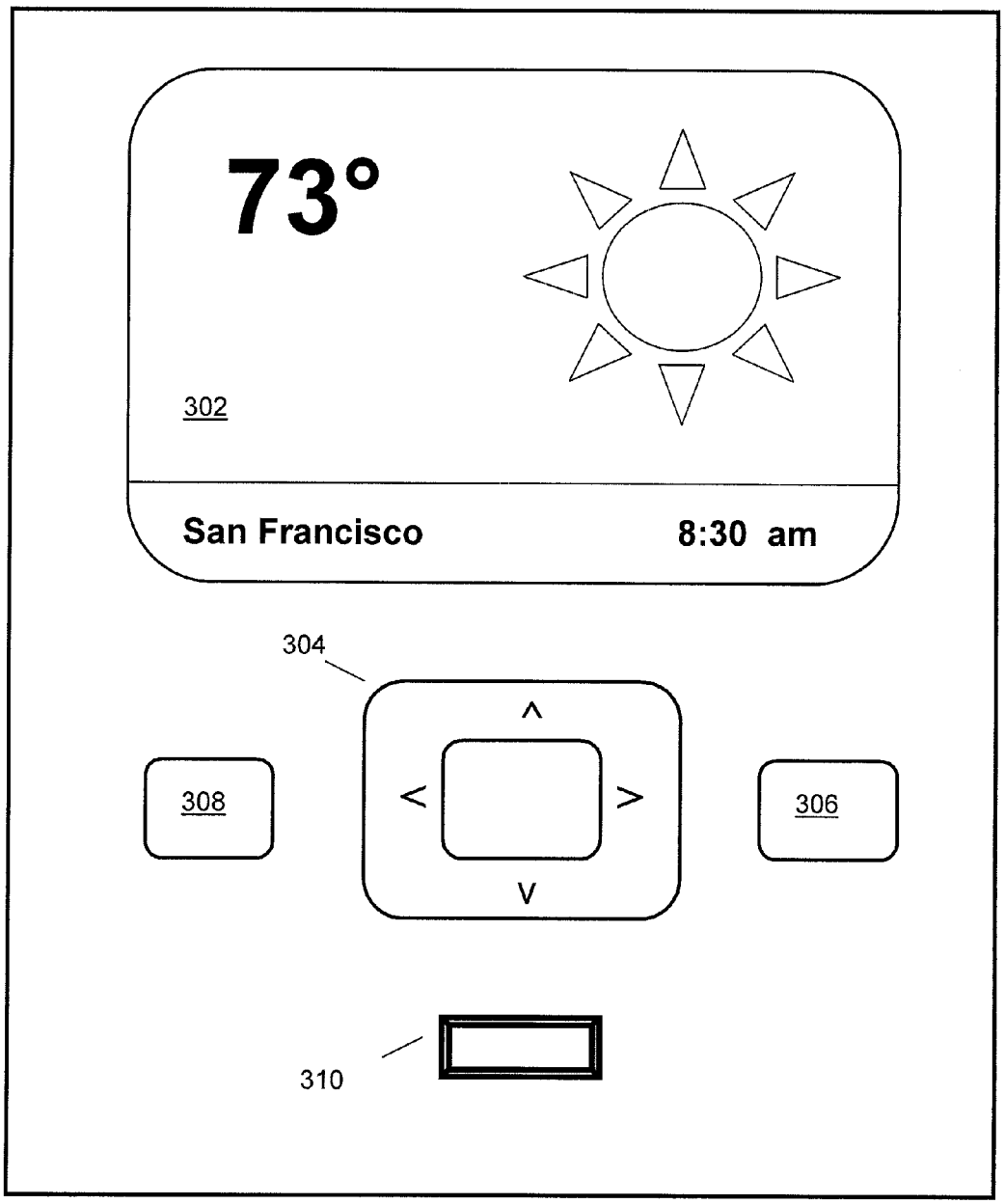
FIG. 3A illustrates an external representation of a service node, under an embodiment.

The service node may be physically implemented in several different embodiments. It may be provided as a set-top appliance that can be directly or indirectly coupled to the home computer 110 and the devices 106, it may be provided as an add-in card or peripheral that is closely coupled to the home computer 110, or it may be provided as firmware functionality implemented through one or more of the devices 106 or central home devices, such as computer 110 or even router 130. In one embodiment, the service node is implemented as a standalone unit that can be centrally placed within an average size home. FIG. 3A illustrates an external representation of a service node, under an embodiment. The service node unit 300 comprises a box that includes a front panel housing a user interface display, and one or more control buttons and interface ports. The user interface display 302 can be any suitable type of electronic display such as a liquid crystal display (LCD) with either color or monochrome capability. It provides the graphical output to the user and can display static or dynamic (video) images. The screen manager component 202 controls the content displayed on through display 302. This can include any information related to the home network, such as topology, device status information, data center information, service provider information, environmental information, and any other appropriate information. It may also serve as the output display for any of the devices, such as media playback devices, and the like. The display can be configured to display certain information when in default mode, such as current temperature, weather, time, and location information.

The control buttons 304 on the service node device include navigation buttons 304 to navigate a cursor or text entry prompt within the display area 302. One or more other control buttons 306 and 308 may be provided to invoke specific functions of the control box, such as changing display settings, access the data center, accessing specific service node functions, and so on.

Figure 3B:
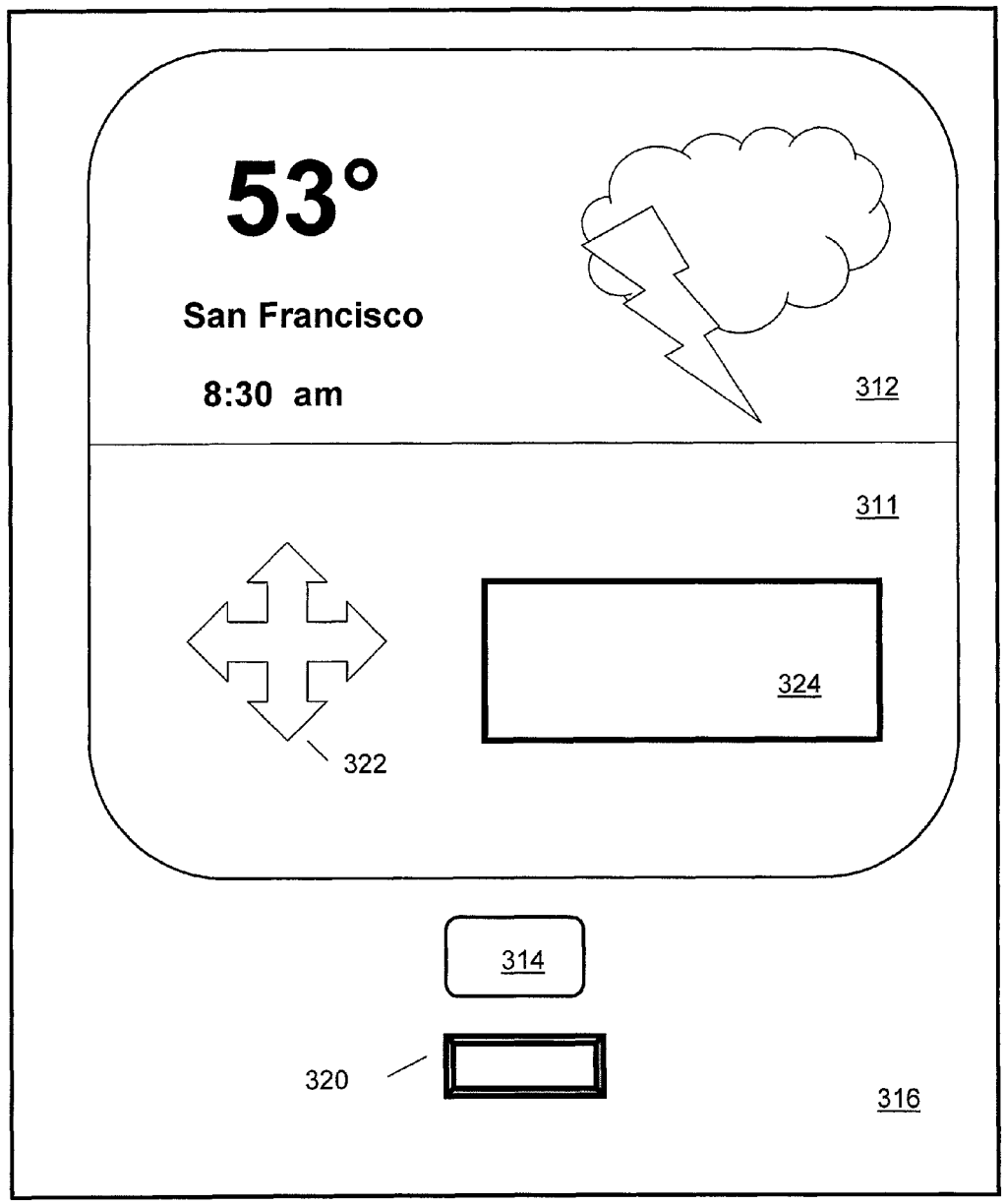
FIG. 3B illustrates an external representation of a service node, under an alternative embodiment.

User input to the device 300 may be provided by an integrated or closely coupled keyboard, trackpad, mouse, or other similar input device. In an alternative embodiment, the keyboard virtual keyboard accessed through a touch screen display. FIG. 3B illustrates an external representation of a service node, under this alternative embodiment. In this embodiment, the display of device 316 comprises a display area 312 and a touch-screen portion 311. This touch screen portion may display one or more user input objects, such as navigation buttons 322 and keypad entry area 324. One or more physical control buttons 314 may also be provided.

The service node may include one or more different communication interfaces for transmission of data to and from the devices 106 and home computer 110. It may include one or more ports or wireless transceivers for communication, depending on the communication protocols that are utilized. The service node unit may also include a voice recognition component to allow the use of spoken commands.

As shown in FIGS. 3A and 3B, the service node unit includes a USB (universal serial bus) port 310 or 320. In an embodiment, the USB port is configured to accept a standard USB flash drive that stores data related to the home network. The flash drive is used to store and transmit information among devices in the network, and, if necessary, to the data center 129, and/or any service providers 114.

It should be noted that the embodiment illustrated in FIGS. 3A and 3B are primarily for purposes of illustration, and many different variations are possible. The control box may be implemented in a box of any practical shape and size, and made of any appropriate material. The display screen, control buttons, and interface ports may be provided on any side or surface of the box and in any desired configuration.

Data Center

The data center 120 comprises one or more server computers 122 executing a server-side process 126 that utilizes data provided by data store 124. In one embodiment, the server-side process 126 includes two sets of enterprise applications used by the service provider 114. An automatic configuration server (ACS) is included to provide provisioning and maintenance functions for the service node 104. As the primary control point for the network management system, it implements a web service API over secure channels. The second component comprises an operational support software (OSS) and business support software (BSS) block. This can be aggregated with a decision support system (DSS) for the technical support staff of the service provider 114 through a web-based portal. An enterprise service bus (ESB) can be used to integrate the internal and external systems of the data center 120. The data center stores the properties of the physical, logical and service components of the home network in a relational database within data store 124. The information maintained in the database can include user information, device information, applications, network protocols, service packages, usage history, problem logs, and any other appropriate information.

In certain implementations, use of devices 106 within home 100 may be subject to usage restrictions, such as parental controls, environmental controls, and so on. In this case, the server-side process may be configured to control and store information related to such use, such as user privileges, parental controls, usage history, usage characteristics, power consumption, and so on. In many home and office environments that provide access to computer devices, user privilege is an important characteristic of installation and control. Various sensitive resources, such as computer files, personal data, and other resources may be exposed through use by family members and guests. The data center can be used to strictly enforce user access privileges in accordance with defined rules. FIG. 4 is a table that illustrates an example of user privilege restrictions for use with a managed computer system, under an embodiment. For the example of FIG. 4, three classes of user are defined, users with password, users without a password, and guest users. Each class has different levels of access to resources, such as files, services (e.g., network access, web access, resident or downloadable applications, etc.), printers, and other networked devices (e.g., game platforms, routers, etc.).

The data center may also be used to control the configuration of such devices, such as setting of certain security or access attributes and allowing for degrees of customization. For interfacing with service providers 114, the data center may store information relating to support history, such as application use, network maintenance, installation details, device configurations, service outages, and the like.

Management Operation

As shown in FIG. 1, the service node is configured to facilitate the control any number of devices 106, each executing a corresponding agent process 108. In general, the devices can be adapted for use by the system or pre-configured for use by the system. For example, a service provider may provide its customer with an appliance that can either be plugged peripherally into a PC, or directly into a working home network. Through the service node, the appliance automatically upon connection discovers its connected environment and probes for other devices. When devices are discovered the appliance catalogs the devices, the resources and services available on the device. By regular catalog analysis, the service node determines the best means for configuring the devices for stable network connection and application interoperation requirements with the other devices as appropriate, and deploys intelligent agents which are able to facilitate configuration of the devices for which is has been deployed.

In addition, the service node has an external facility for a forced discover process to manually begin an automated process to configure devices for use and interoperation on the home network and integrated as described above for inclusion in the catalog. The service node 104 and agent process 108 work together to proactively maintain a healthy home network and provides the facility for delivering automated maintenance tasks in support to keep connected devices healthy. Both the service node and agent have facilities for notifying customers of problems that can not automatically be repaired. When a home network is connected to the public Internet 110, the service node 104 and/or intelligent agent 108 periodically connect to the data center host computer 120 through a web services application interface. The data center 120 provides a collection of additional services made up of several databases which record the catalog of the home network. At the request of the service node 104 and agent 108 it provides resources that enable the ongoing maintenance and management of the home network and the devices in the catalog.

Service providers 114 using the public Internet 110 can access the data center 120 through a web services application interface to obtain information regarding the customer's home network, such as last known state, and connected device configuration. The data center 120 is configured to provide the service provider 114 with a number of resources to augment proprietary CRM (customer relationship management) systems relative to the information and as well deliver customer support for the managed home network subscriber. The data center 120 will also provide automated resources for real-time interaction with the home network when possible. The services delivered by the system are based upon established standards of interoperation of the devices in the catalog and executed by policies set by the service provider 114.

The service node 104 can be pre-configured for use in a particular home environment 102 or it can be installed and configured for use in any home environment in conjunction with data center 120. In this case, the installation process involves connecting the service node to a home client computer 110 and executing an installation routine that access the data center 120 through a home router 130 or through the client 110. Once the service node is properly installed, the home network can be set up through registration of the devices 106 with the service node 104 and home client 110.

Figure 5:
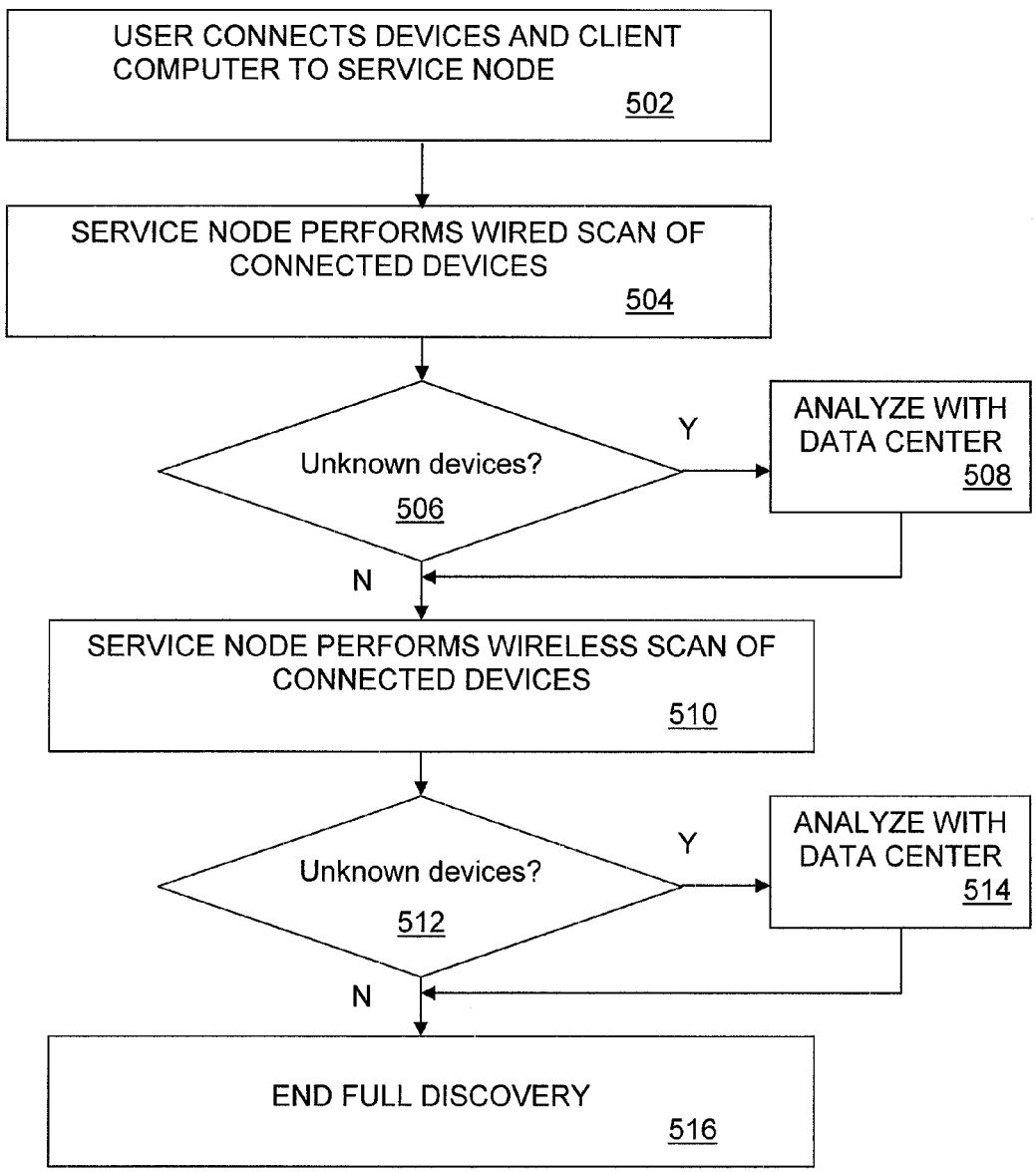
FIG. 5 is a flowchart that illustrates a method of home network installation, under an embodiment.

FIG. 5 is a flowchart that illustrates a method of home network installation, under an embodiment. FIG. 5 illustrates a method of performing full discovery of devices that may be connected through wired or wireless connections to the service node. In block 502, the user connects any wired devices to the service node and/or activates the wireless transceiver in the service node for communication with any wireless devices within range. The service node then performs a wired scan of the connected devices, block 504. During the device discovery phase, the service node detects the presence of a device or an application through USB, UPnP, SNMP or ICMP protocols. If a client computer 110 is coupled to the service node, the service node or the client-side process 112 of the client computer checks the router IP table to determine if there are any connected devices. Other resource listings of the client computer may also be used, such as a device registry.

In block 506 it is determined if any unknown wired devices are detected. If there are any unknown devices, the data center is queried to determine whether the unknown devices are supported, block 508. If the device is known to the data center, the appropriate information is passed back to the service node, otherwise, an error message is flagged and any product information is noted. At this point, a service provider may be identified and contacted to provide the appropriate information; otherwise, the device is flagged as "identified" and unsupported. In addition to wired devices being detected, the service node performs a wireless scan of connected devices within range, block 510. In block 520 it is determined if any unknown wireless devices are detected. If there are any unknown devices, the data center is queried to determine whether the unknown devices are supported, block 514. If the device is known to the data center, the appropriate information is passed back to the service node, otherwise, a system message is generated that an "identified", but unsupported device has been detected and any product information is noted. At this point, a service provider may be identified and contacted to provide the appropriate information; otherwise, the device is flagged as unsupported. The service node as well as the agents are listening for new devices as they connect to the home network.

Once the devices are detected, agents 108 can be installed on each device. In the case where the device or devices are a computer or device with a USB port, a physical USB key can be used to install the agent directly onto each computer. In one embodiment, the USB key is implemented in a customized USB flash drive. The key may be implemented as a flash memory device that has the read/write space partitioned away to prevent use as a standard flash drive by the user. The USB key has a hardware controller to provide enumeration of USB device ports and an installation program that is executed locally on the computer to install the agent and register the computer with the system. The key can be updated by the service node 104. The key is used for adding new devices to the network. In general, the first device defined in the network is physically coupled to the service node through a USB (or equivalent) cable. All subsequent devices are added using the key.

Devices that are not able to use the key are discovered and facilitated by a remote agent resident in the service node, with a fail-over remote agent in the client-side process 112 of the PC 110. For devices that do not have a USB port, or sufficient processing power to execute the agent installation process from the key, the agent process can be pushed onto the device through the appropriate wireless or wired protocol. In this case, an installation process executed on the service node or the client computer may and may be executed through the service node GUI.

The service node can also be configured to set any wireless security protocols defined by the system and/or the wireless devices in conjunction with policies determined in advance by the service provider. As the devices 106 have been properly detected through the discovery process, the data center can build a topographical map of the home network environment. Various operational and setup parameters regarding the devices are stored in one or more databases in data store 124.

In an embodiment, each device 106 has installed on it an agent process 108 that acts as a communication conduit to the service node 104. If the service node is missing from the system, the installed agents for each device can poll one another and alternate as fail-over domain authority for communication to the data center 120. The agents keep track of relevant transactions, such as software and device installation/updates, configuration changes, and so, for the device on which they are installed. Agents receive instructions from the service node 104, as well as from the data center 120, as appropriate to policies and local conditions/states, to facilitate management of the devices.

The agent includes two main components, an interface to transfer data from the service node to the device, and a cross-platform module. For home devices with the appropriate computing/system resources and port configuration (e.g., USB), the key is used to install the agent 108. In certain cases, the key stores all service resource information for existing devices. Upon installation of a new device, it takes an inventory of the characteristics, operating states, and resources (e.g., files, input/output ports, etc.) of the device. If any similar devices are already loaded on the key, certain parameters may be downloaded to the new device to facilitate configuration. For example, if a second PC is installed, the parameters for shared resources (e.g., files, devices, etc.) from the first PC can be transferred to the second PC through the key. Once the information is obtained for the new device, it is written to the registry. The registry is a data structure that contains all relevant information regarding the device and is a component of the network topography. The registration process consists of writing new device data to the registry, as well as informing all other devices in the network of the existence of the new device. The topography is then updated to reflect the new network. This topography defines the relationship among the devices, the characteristics of each device, and policies among the devices, such as file/resource sharing, user privileges, security, and so on. The topography provides not only a physical mapping of the home network, but an overall operational context for each device within the network relative to all other devices in the network. In this manner, the effect of any changes or problems with one device can be quickly detected for any other device. This system also provides a comprehensive view for the service provider with regard to the entire network, as opposed to a particular device. For example, a service provider may receive a message regarding a problem with a specific device. Through the topography, the service provider can see all other devices connected to the device, and may therefore have a better idea of the problem cause or solution given the context of the entire network.

As the home network is established with discovered devices, and the registry has been built with definitions of the devices, the ongoing usage activities include monitoring devices, adding new devices, removing devices, updating devices, troubleshooting and repairing devices, reconfiguring devices, and similar tasks. The ongoing usage tasks can be initiated and performed by the user directly, or they may be automated with minimal user input.

The configuration of devices within the network can be facilitated by the use of defined and distributed drivers for such devices. Such drivers can be provided by service providers or other third parties, or they may be defined by the data center. In the case of problems with installed devices, problems may be detected by the user, by the device itself, and/or by the service node. In certain cases, an autofix routine may be available to diagnose and fix the problem before a user is ever aware. Such a routine may be deployed automatically by the service node, or available from the data center or from the service provider for deployment from the data center. If an autofix routine is not available, the user may be instructed via the service node to access documentation (e.g., through a website) to try to solve the problem himself or herself or to contact an appropriate service provider.

Figure 6:
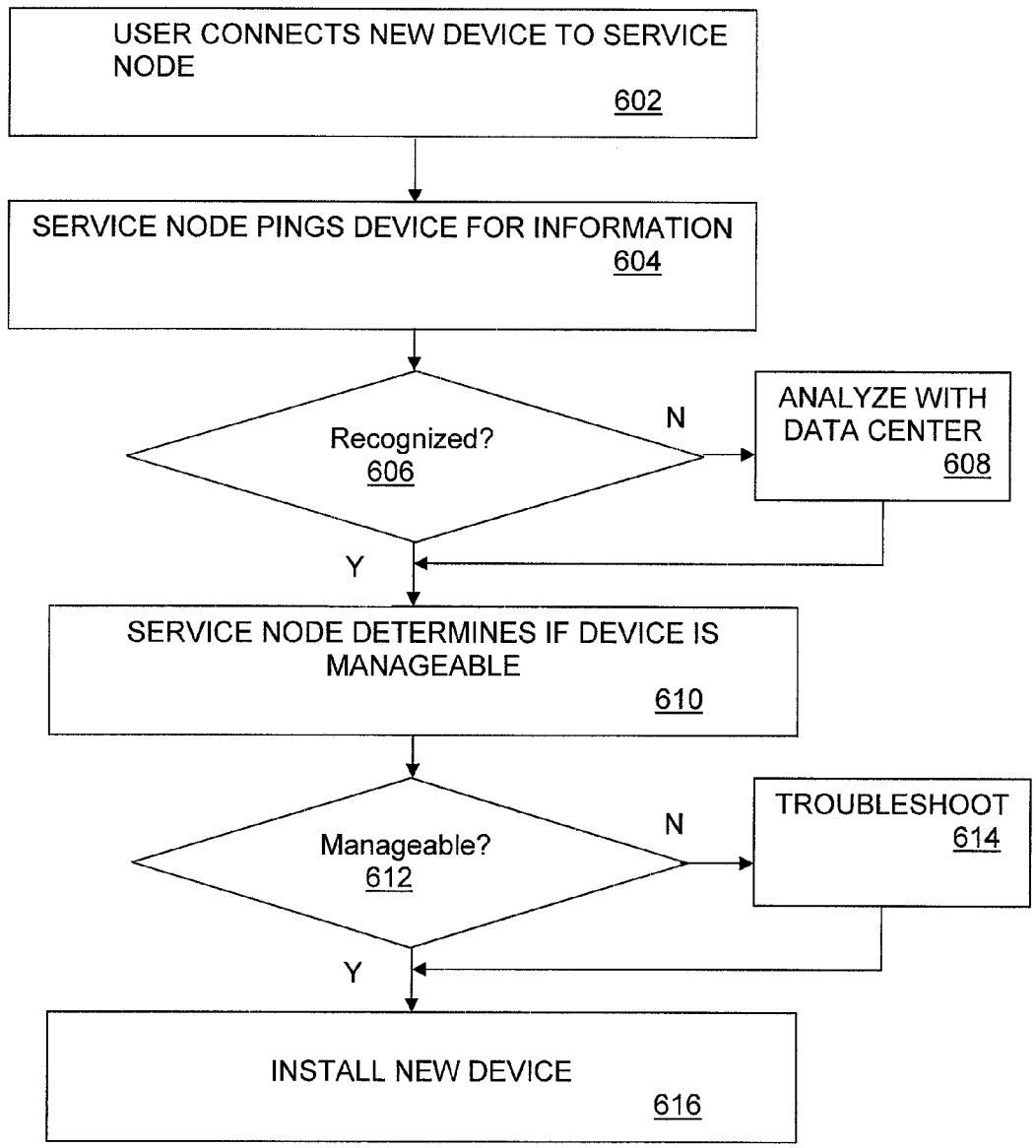
FIG. 6 is a flowchart illustrating a method of installing a new device into a home network, under an embodiment.

One issue surrounding home networks is the addition of new devices. In present systems, a user must often go to great lengths to properly install new devices. Embodiments of the system allow for automated installation of new devices using the service node and data center system of FIG. 1. FIG. 6 is a flowchart illustrating a method of installing a new device into a home network, under an embodiment. In block 602, the user connects any new wired devices to the service node and/or activates the wireless transceiver in the service node for communication with any wireless devices within range. The service node then pings the new device for any available information, block 604. In block 606 it is determined if the new device is recognized. If it is not recognized, the data center is queried to determine whether the new devices are supported, block 608. If the device is known to the data center, the appropriate information is passed back to the service node, otherwise, an error message is flagged and any product information is noted. At this point, a service provider may be identified and contacted to provide the appropriate information, otherwise, the new device is flagged as unsupported. Once the device is recognized, the service node determines if the new device is manageable, block 610. If, in block 612 it is determined that the device is not manageable, a troubleshooting process is performed. Once a the device is recognized and determined to be manageable, it is installed, typically by loading the appropriate driver and registering the device with the data center.

FIG. 7 is a table that illustrates actions associated with addition of a new device in a managed home network, under an embodiment. The table of FIG. 7 provides the processes executed at various stages of the new device installation process of FIG. 6, such as in the case where a new device is not recognized or determined to be not manageable.

In certain cases, devices in the home network may be desired to be removed. Device removal may be initiated by the user or by the service node or the client-side process 112. The removal of devices typically involves the identification of devices to be removed and the uninstallation of device drivers and associated software. The network map and registry in the data center 120 is then updated to reflect the removal of the device. The user can then physically remove or otherwise disable the device. In certain circumstances, a user may wish to remove the device from the managed network, yet still use the device as a standalone device. In this case, the device may be removed from the network or it may be flagged as an unmanaged or disabled device.

The home network management system also implements a monitoring function to track the operability (health) of the devices and entities of the network. The devices, service node, client computer, agents, data center, and communication lines to the service providers can all be constantly monitored. The relevant databases that stored information with each monitored object are also monitored to ensure that information and update/upgrade information is accurately reflected.

User Interface Implementation

In one embodiment, the service node 104 provides a user interface portal to the managed home system that is accessed through a web browser from either a home computer 110, remote computer 140, server computer 122, or the node device itself 104. The user interface portal provides a mechanism for service providers 114, authorized agents (e.g., through remote client 140), and the data center 120 to view the home LAN environment 102 and any relevant characteristics of the network. The user interface is provided as a series of hierarchical or linked web pages, with any number of subwindows for displaying data objects and related information or data entry elements.

Figure 8:
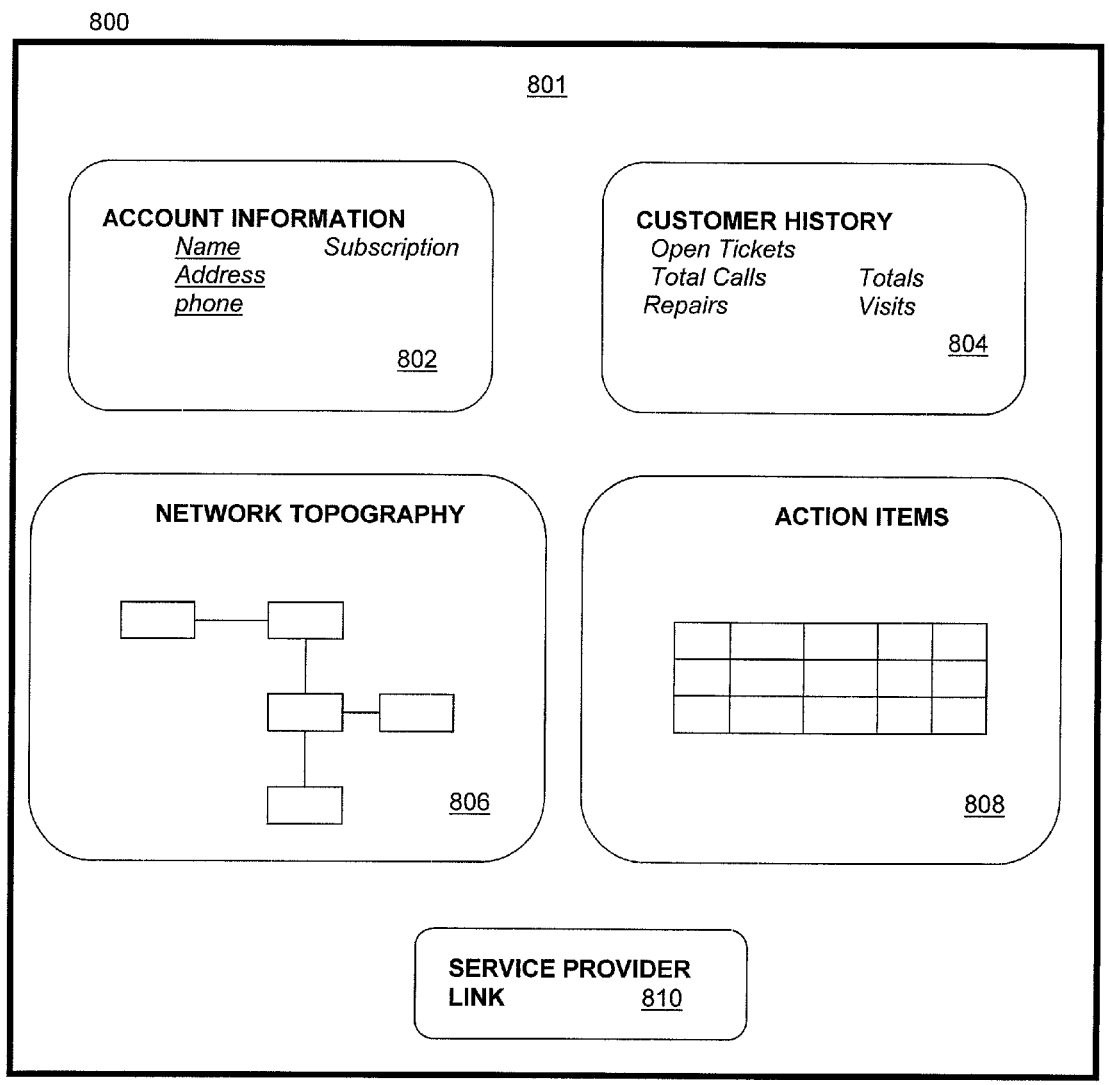
FIG. 8 illustrates a first level display page for a web-based user interface for the home network portal, under an embodiment.

FIG. 8 illustrates a first level display page for a web-based user interface (UI) for the home network portal, under an embodiment. The web page 800 includes several different display areas that display elements of the network and, if appropriate, allow user input to enter or get information or select other regions of the UI. The main display area 801 of web page 800 includes display areas related to the customer or homeowner, such as account information 802 and customer history 804. The lower portion of the screen 800 has a home network overview display area 806, which displays the topology of the network. The network topology comprises a representation of the network element (devices and computers) in the network as well as their interconnections. It can be provided as a graphical map, an indexed list, or any similar representation. Also provided in screen 800 is a list of action items 808. This display area provides a view for the service provider 114 to view likely issues and provide an indication of why the customer may be calling based on conditions reported by the service node to the data center. The display screen 801 also includes a link 810 that provides access to the service provider web site. Depending on the number of service providers available, any number of links can be provided. This display area could also be used to display certain pertinent information regarding the service provider(s), including, for example contact information, configuration instructions, latest patches, and so on.

The display screen 800 is provided only as an example, and it should be understood that many other configurations and display elements can be implemented to embody the UI portal of the home network management system.

Figure 9:
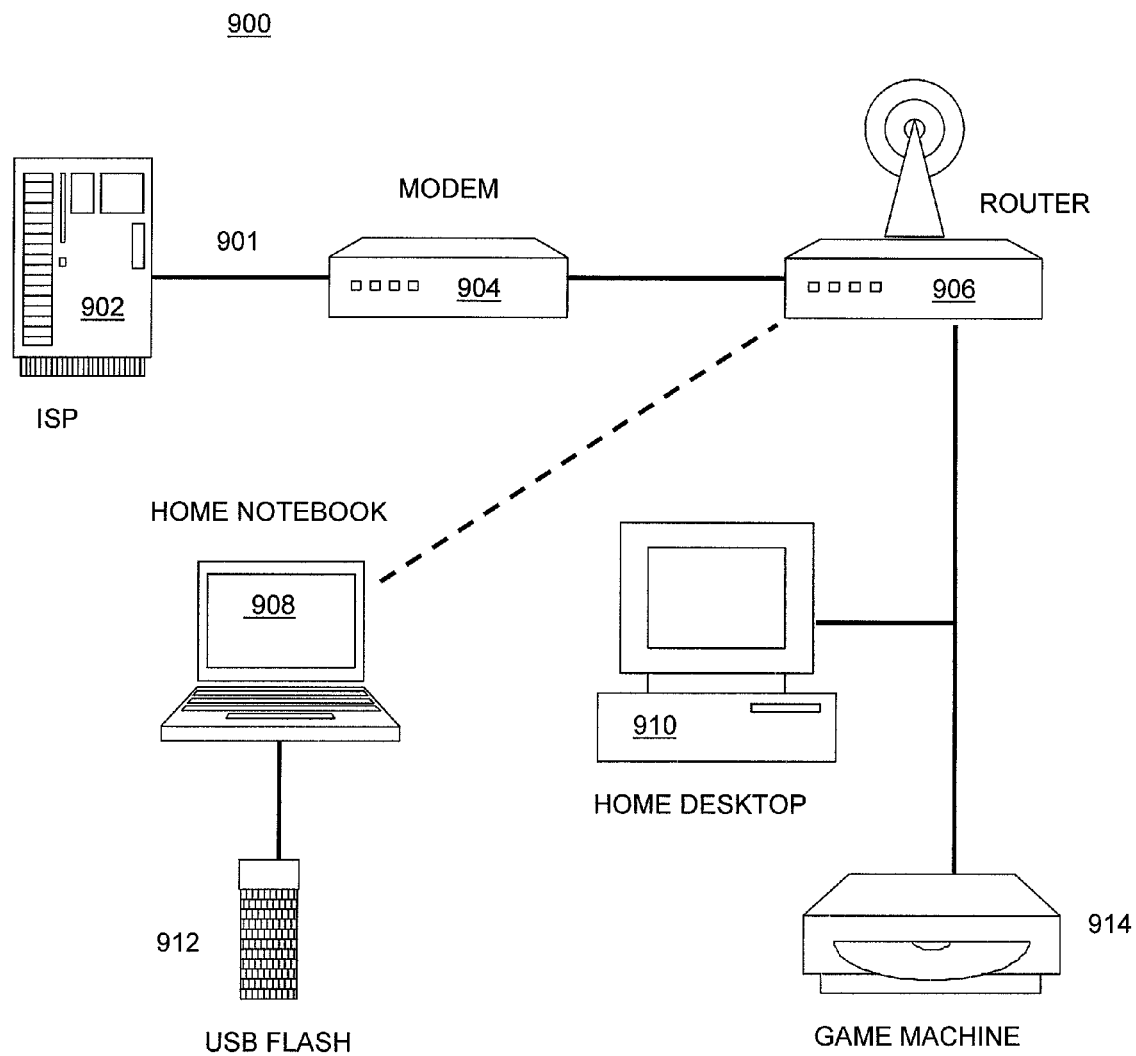
FIG. 9 illustrates an example of the display of a network topology, under an embodiment.

The network topology displayed in display area 806 is typically provided in the form of a graphical network map with objects representing the network elements and the physical and/or logical links among the network elements. FIG. 9 illustrates an example of the display of a network topology, under an embodiment. For the network topology example 900 of FIG. 9, a typical home network is shown consisting of a home desktop 910, a home notebook 908, and peripheral devices such as a game machine 914, and USB device 912. Internet service is provided by an ISP 902, and the home devices are connected to this network through a modem 904 and internal (e.g., wireless) router 906. Each graphical device icon represents a data object that can be accessed to display specific information relating to the device, such as type, manufacturer, operating parameters, status, and other relevant information. Within the network, each device is coupled to at least one other device through a wired or wireless link 901. The link icons 901 also represent data objects that can be accessed to display specific information relating to the link, such as link type, status, and other relevant information. The topography display can be configured in any number of ways to display information related to each data object. For example, colors and/or shape icons can be displayed in conjunction with data objects to display status information. In an embodiment, colored dots are used with the link icons to indicate link status. For example, a red-dot on the link connection between the modem 904 and the router 906 may indicate a problem in this link, while a green dot indicates a functioning connection.

Each data object is a selectable object that provides an additional UI window displaying relevant information or providing for user input. For example, a user can select the router icon 906 and get specific router information. Clicking on the router icon itself will cause the display of a separate display page that shows detailed information about the router. In one embodiment the display area provides tabs to access other display windows for the UI. For example, one tab can provide a view to the devices in the network, and another tab can provide a view to the services in the network.

FIG. 10 illustrates an example web page for a device view of the home network management user interface, under an embodiment. This display provides a table 1000 that lists the network elements and associated information. Different classes of network elements can be defined, such as device, service, link, network, and so on. Each element can have an item name. The table also displays status information, status level, and any other information, such as date of deployment. In one embodiment, each table entry provides access to additional information relating to the entry, which can be displayed in the form of a pop-up or overlay window, or a link to a new window. As shown in FIG. 10, selecting a particular table entry indicating a problem (e.g., red link) causes the display of a supplemental display area 1002 that provides additional information, such as diagnostic information or possible solutions to the problem. The information provided in any such supplemental window can be provided by a service provider, the system itself, or any appropriate network entity.

The information provided in supplemental display area 1002 may provide instructions to the user indicating how a problem is to be solved, or it may provide links or access to utilities that solve the problem. For example, a service provider may instruct the user to reboot the router and provide instructions on how the router is rebooted. Once this step is performed, the UI includes a utility to update the network database and topology. This change can be reflected by display elements, such as turning a link or router from red to green, or some similar indicator. If any changes to the network or other devices are caused by the change, the network UI will be updated accordingly. In this manner, the system provides an updated context of the network at all times. The condition of each device and service relative to all other devices and services is tracked, updated, and available for display to any of the network entities, and especially to the service provider.

It should be noted that the UI display process may use any type of graphical indicator to denote the state or change of state or a network element, application, or other managed object. For example, icons can be displayed as green if operating normally, yellow if a warning condition exists, and red if there is a failure. The color noted in one or more of the web pages indicates this condition.

The network elements within the home network typically comprise devices, which are hardware elements, and services, which can be applications or attributes of the network.

FIG. 11 illustrates an example web page for a services view of the home network management user interface, under an embodiment. As shown in window 1100, services can include operating systems, security settings or mechanisms, applications, sharing settings, quality-of-service (QoS) settings, and utilities. The table provides entries that indicate service name, service type, status, and diagnostic information. The service view provides a picture of all of the devices on the network. Services include things experienced by the customer. For example, the security service includes spy-ware, anti-virus software, and the like, as well as parental controls and privileges; and while back-up is a configuration issue plus software it too is facilitated as a service.

A principal aspect of the home network management system is the aggregation and provision of data from the home network to relevant entities, such as the service provider. In one embodiment, important incidences and messages are transmitted through an action item display area 808, of the UI of FIG. 8. FIG. 12 illustrates an example of an action item display area, under an embodiment. As shown in FIG. 12, the action item display area lists items in terms of attention level, as indicated by a color (e.g., green, yellow, red). The status of any particular item is then displayed along with any possible resolutions. In one embodiment, a service provider can run applications or utilities on specific devices facilitated by the service node, as part of the diagnostic or resolution process. This could be a service provider's own utility or one that is commercially available. For the example of FIG. 12, the possible resolutions include disk utilities provided by the service provider, or on site actions performed by a technician.

As shown in FIG. 1, the functionality provided by the service node can be accessed by a home computer 110, or a remote computer 140. This allows the service node to be embodied in a light weight device that is small, highly mobile, easy to install, and/or relatively inexpensive. This also helps to keep the UI on the service node screen fairly simple. Any detailed display or complicated interaction can take place on the user's computer 110 or 140. In certain circumstances, a user may initiate operation through the service node, but if transaction or display of information becomes too complicated, the user will be directed to use the main PC screen instead of the service node screen. For this embodiment, the client-side process 112 is the application on the PC that the user interacts with. This process interfaces directly with the service node and is a companion to both the service node, as well as system website. This interface can be configured to have a similar look and feel to the service node interface, but in general, it allows the user to see more complicated information (like a network topology map) and control more complicated product features, since computer displays are generally much larger than the display that may be provided in the service node.

FIG. 13 is an example of a client computer interface screen to the service node system, under an embodiment. The interface between the client computer and the service node is typically provided through a web interface. For the example web page 1300 of FIG. 13, the main display area is divided into a device information component showing a picture of any selected device and the detailed parameters associated with the device. The second area displays information regarding the home network and the customer. In general, web page 1300 represents the top level of a hierarchically organized series of UI pages into the system as accessed through the client computer. Many other items of information and elements of user control can be provided through the main web page 1300 or any of the subsequent web pages.

The overall system of FIG. 1 enhances the proactive and reactive support paradigm for both service providers 114 and their customers because it creates a holistic end-to-end reference of the home network 102, connected devices 106 and their specific software applications. As a managed service, the home network management system ensures repeatability and efficient deployment since all devices and services are deployed by policies which are set by the service provider based on standards for network operation and device application interoperation.

The systems and methods described herein include and/or run under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, cellular telephones, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

Components of the systems and methods described herein can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the systems and methods described herein is not intended to be exhaustive or to limit the systems and methods described to the precise form disclosed. While specific embodiments of, and examples for, the systems and methods described herein are described herein for illustrative purposes, various equivalent modifications are possible within the scope of other systems and methods, as those skilled in the relevant art will recognize. The teachings of the systems and methods described herein provided herein can be applied to other processing systems and methods, not only for the systems and methods described above.

The elements and acts of the various embodiments described above can be combined to provide further embodiments. These and other changes can be made to the systems and methods described herein in light of the above detailed description.

What is claimed is:

1. A system for facilitating management of a home network including consumer devices, comprising:
    a service node including one or more communication links to a plurality of devices deployed in a home environment, wherein at least some devices of the plurality of devices are produced by different manufacturers, and wherein each of the plurality of devices executes a respective agent process that provides configuration information regarding the device to the service node, wherein the configuration information is stored in a device registry, wherein the respective agent process acts as a proxy to the service node and is loaded directly into the corresponding device through a custom memory device coupled to the corresponding device, and wherein the custom memory device stores service resource information for existing devices in the home environment, and downloads information to the corresponding device based on the stored information;
    a computing device coupled to the service node and executing a client-side process providing device support for each of the plurality of devices through the service node;
    a data center coupled to the service node storing device parameter information in the device registry, and to generate a network topology representing operational characteristics of the devices and interconnection information among the devices, wherein the network topology is displayed through a graphical user interface of the service node; and
    an interface to one or more service providers, each service provider comprising a manufacturer or an agent of a manufacturer and providing configuration and maintenance information to a user of a respective device of the at least one of the devices, the interface providing the network topology to each service provider to facilitate servicing of a device based on the network context of the device.

2. The system of claim 1 wherein the service node executes a Universal Plug and Play (UPnP) protocol to functionally connect the apparatus to the plurality of devices.

3. The system of claim 1 wherein each device of the plurality of devices is an active device that is capable of storing and executing software program, and wherein at least one of the plurality of devices is a non-computer consumer electronic device selected from the group consisting of: a home appliance, a media playback unit, a security system component, and a lighting component.

4. The system of claim 3 wherein the data center includes at least one server executing an automatic configuration process for provisioning and maintaining the service node, and an operational support software process for maintaining programs executed by the plurality of devices, the data center further comprising a data store storing operational data related to the plurality of devices and the network topology.

5. The system of claim 1 wherein the client-side process executed by the computing device coupled to the service node performs network configuration and management tasks for the plurality of devices, and provides a user interface for displaying network topography and related devices and services on a display coupled to the computing device.

6. The system of claim 5 wherein the management tasks include discovering devices in the network, adding new devices to the network, removing devices from the network, and monitoring the plurality of devices in the network.

7. The system of claim 1 wherein the one or more service providers each maintain a computer platform configured to couple to the data center over a network, and which provides a virtual connection to the service node.

8. The system of claim 1 wherein the one or more service providers each maintain a computer platform communicatively coupled to the data center over a network, and which provides a virtual connection to the service node.

9. A method of facilitating the configuration and management of devices for use in a home network consisting of a plurality of consumer electronic devices coupled to a service node, the method comprising:
    executing a discovery routine to discover compatible devices of the plurality of devices in the network, wherein at least some of the devices of the plurality of devices are produced by different manufacturers;
    performing a search of devices in a database stored in a data center for devices in the network that are not compatible;
    loading an agent process into each device of the discovered compatible devices for local execution on the respective device, the agent process communicating with the service to provide operational data relating to the respective device, wherein the agent provides fail-over for critical communication and service systems of the service node and proxy communication to a data center, wherein the respective agent process is loaded directly into the corresponding device through a custom memory device coupled to the corresponding device, and wherein the custom memory device stores service resource information for existing devices in the home environment and downloads information to the corresponding device based on the stored information;
    storing device parameters of discovered compatible devices in a registry;
    determining logical and physical interconnections among the plurality of devices in the network;
    generating a network topography comprising the registry data and the logical and physical interconnection data;
    displaying the network topography to the data center and to a graphical user interface of the service node; and
    interfacing with at least one service provider comprising a manufacturer or an agent of a manufacturer to provide configuration and maintenance information to a user of a respective device of the plurality of devices, the interface providing the network topology to each service provider to facilitate servicing of a device based on the network context of the device.

10. The method of claim 9 wherein each device of the plurality of devices is coupled to the service node through one of a wired link or a wireless link, and further wherein the custom memory device stores service resource information for existing devices in the home environment, and downloads information to the corresponding device based on the stored information.

11. The method of claim 10 wherein compatible devices conform to one of the Universal Plug and Play (UPnP) protocol, UDP, TCP-IP, Zero-conf, HTTP, or HTTPS.

12. The method of claim 11 wherein the agent process interacts with a control process executed on the service node to allow management of the respective device by the service node, wherein management includes monitoring the respective device, detecting problems, performing device troubleshooting, removing the respective device, and updating the respective device.

13. The method of claim 12 wherein at least one of the plurality of devices is a non-computer consumer electronic device selected from the group consisting of: a home appliance, a media playback unit, a security system component, and a lighting component.

14. The method of claim 13 wherein the at least one service provider provides configuration and operational data related to the respective device.

15. The method of claim 14 further comprising displaying operational information related to the network through a the graphical user interface on the service node.

16. The method of claim 15 further comprising displaying operational information related to the network through a graphical user interface on a computer coupled to the service node, the computer executing a client-side process, which provides configuration and management processes for management of the plurality of devices.

17. The method of claim 9 further comprising interfacing the service node to the data center over a network, the data center including at least one server executing an automatic configuration process for provisioning and maintaining the service node, and an operational support software process for maintaining programs executed by the plurality of devices, the data center further comprising a data store storing operational data related to the plurality of devices.

* * * * *